(12) United States Patent
Losey et al.

(10) Patent No.: US 6,573,678 B2
(45) Date of Patent: Jun. 3, 2003

(54) "EXPRESS UP" VEHICLE WINDOW SYSTEM AND METHOD

(75) Inventors: Allan Losey, Ortonville, MI (US); Steve O'Connor, West Bloomfield, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 127 days.

(21) Appl. No.: 09/798,137

(22) Filed: Mar. 2, 2001

(65) Prior Publication Data

US 2001/0030520 A1 Oct. 18, 2001

Related U.S. Application Data

(60) Provisional application No. 60/186,580, filed on Mar. 2, 2000, and provisional application No. 60/186,582, filed on Mar. 2, 2000.

(51) Int. Cl.[7] .................................................. H02P 1/22
(52) U.S. Cl. ...................................... 318/470; 307/10.1
(58) Field of Search ................................ 318/280–286, 318/466–470, 474, 434, 445, 446; 307/10.1

(56) References Cited

U.S. PATENT DOCUMENTS

| | | | | |
|---|---|---|---|---|
| 5,572,101 A | * | 11/1996 | Rutkowski et al. | 318/265 |
| 5,616,997 A | * | 4/1997 | Jackson et al. | 318/286 |
| 5,698,907 A | * | 12/1997 | Weber | 307/10.1 |
| 5,857,061 A | * | 1/1999 | Chang et al. | 318/280 |
| 5,949,207 A | * | 9/1999 | Luebke et al. | 318/446 |
| 6,002,224 A | * | 12/1999 | Stern | 370/10.1 |

FOREIGN PATENT DOCUMENTS

| | | |
|---|---|---|
| GB | 2013428 A | 8/1979 |
| WO | WO 98/08286 A1 | 2/1998 |
| WO | WO 00/01911 A1 | 1/2000 |

OTHER PUBLICATIONS

49 CFR Ch. V (Oct. 1, 1999 Edition) 571.118; 571.119.

* cited by examiner

*Primary Examiner*—Jeffrey Donels

(57) ABSTRACT

A system and method for automatically closing a moveable panel, such as a vehicle window. A power drive mechanism is controlled by a controller. The controller determines if the user has issued an "express up" command. Only if the panel is beyond a predetermined proximity of its fully closed position when the "express up" command is issued, is the panel is powered to the fully closed position under its normal circumstances. If the panel is within the predetermined proximity, however, exception processing occurs.

16 Claims, 3 Drawing Sheets

"EXPRESS UP" VEHICLE WINDOW SYSTEM AND METHOD

CROSS REFERENCE TO RELATED APPLICATIONS

This application relates to and expressly claims priority from U.S. Ser. Nos. 60/186,580 and 60/186,582, both filed Mar. 2, 2000.

BACKGROUND OF THE INVENTION

1. Technical Field of the Invention

This invention relates to a system and method for controlling the manner of raising a vehicle window using a power drive mechanism.

2. Background Information and Description of the Related Art (Including Information Disclosed Under 37 CFR §§1.97 and 1.98)

Published PCT application WO 98/08286, published Feb. 26, 1998, owned by Siemens A G, discloses a window motor gear drive which monitors motor current to protect against possible pinch situations in vehicle sliding roofs and windows. U.S. Pat. No. 5,801,501, issued Sep. 1, 1998, discloses a window drive motor control that monitors motor speed and slows the motor depending on window position. Published PCT application WO 00/01911, published Jan. 13, 2000, discloses a drive mechanism which mechanically limits motor torque. A system such as of U.S. Pat. No. 5,801,501 may use this type of mechanism.

BRIEF SUMMARY OF THE INVENTION

There are numerous systems in the prior art for detecting situations in which a closing window should cease closing, because an obstacle may be in the way. In fact, U.S. vehicle safety standards require that vehicle power windows automatically sense certain types of obstacles, and that the closing window must automatically reopen if any of those obstacles are present. These standards are at 49 CFR §571.118, and are part of the larger body of rules commonly referred to as the Federal Motor Vehicle Safety Standards, or FMVSS.

Often, there are two modes for closing a vehicle window. The first mode is commonly referred to as "up" or "conventional up." All power window systems have this mode. While an "up" button is pressed, the window is driven up. When the button is released, the window stops. Thus, in conventional "up" mode, the operator ultimately decides when to start and stop closing the window.

Many vehicles, however, include a second mode commonly referred to as "express up." When the "express up" button is pressed, the window is driven closed even if the user is no longer pressing the "express up" button. The user need not do anything more. Rather, so long as the user doesn't press a contrary button, such as "window down", window controls common in the art interpret an "express up" command to mean that the window should be driven all the way to its fully closed position.

Typically, a power window system will detect an obstacle based upon the function of the motor driving the window. There are many ways of doing this, such as monitoring motor current (or torque) or by monitoring motor speed, as disclosed respectively in the two prior art items referenced above.

In most of these systems, the motor detection algorithm relies upon sampling the motor attribute (current or speed) while the window is closing, and comparing that sampled attribute to a previously sampled value. If the most recent sample is noticeably different from previous samples, or if there is an unusual rate of change in these attribute sample values, then the motor may have perhaps encountered an unexpected obstacle. As such, the system reverses the motor to reopen the window.

If the starting position of the window is very close to the frame, it may be difficult for the detection algorithm to reliably discern the required changes in motor attributes. This may be because the motor will not be operating long enough to have yet come up to its full rotational speed. In this situation, the motor is still accelerating, and as such the motor attribute samples are often less reliable because of this acceleration. Thus, drawing effective comparisons between current and historical attribute samples is often difficult. These comparisons, however, are often necessary in order to perform a motor attribute trend analysis, to thereby discern the possible presence of an obstacle.

Likewise, the physical constraints of the window guides and channel may bind the window more as it approaches its final closed position. This situation may cause all attribute samples in that region to trend as if an obstacle is in the way, when in fact there may not actually be any obstacle.

All of these factors may make discerning the actual presence of an obstacle more difficult. It is therefore beneficial to have a system and method for improving the environment in which to sample the motor attributes during "express up" mode, when the starting position of the window is quite close to its final closed position. The present invention accomplishes this by determining the position of the window before beginning to close it. If the position of the window is within a predetermined proximity of its final closed position, then the "express up" command is not honored in its normal course. Instead, exception processing occurs. This exception processing may take the form of ignoring the "express up" command. The user may still close the window using the conventional "up" command, but he must continue pressing and holding the "up" button to do that. Under a different exception processing scenario, the window will be opened up to a neutral position before proceeding toward close in "express up" mode. Under a third exception process, the "express up" command will proceed to close the window from the point at which the command was received, but the window control system will heighten the sensitivity of its obstacle detection scheme.

One object of the present invention is to provide a system and method whereby a power window control can improve the likelihood that it can more readily discern an obstacle when in "express up" mode, when the starting position of that window is quite close to its final closed position. Another object is to decrease the likelihood of pinching a small object during an "express up" operation, when the window is near its closed position when the express up command is issued. A further object is to effect these objects using the sensors and controls already present in a power window system, thus alleviating the need for extra components.

BRIEF DESCRIPTION OF THE SEVERAL VIEWS OF THE DRAWING

The objects, features and advantages of the present invention can be better appreciated by referring to the following description of the preferred embodiment and the accompanying drawings in which.

DETAILED DESCRIPTION OF THE INVENTION

Figure 1:
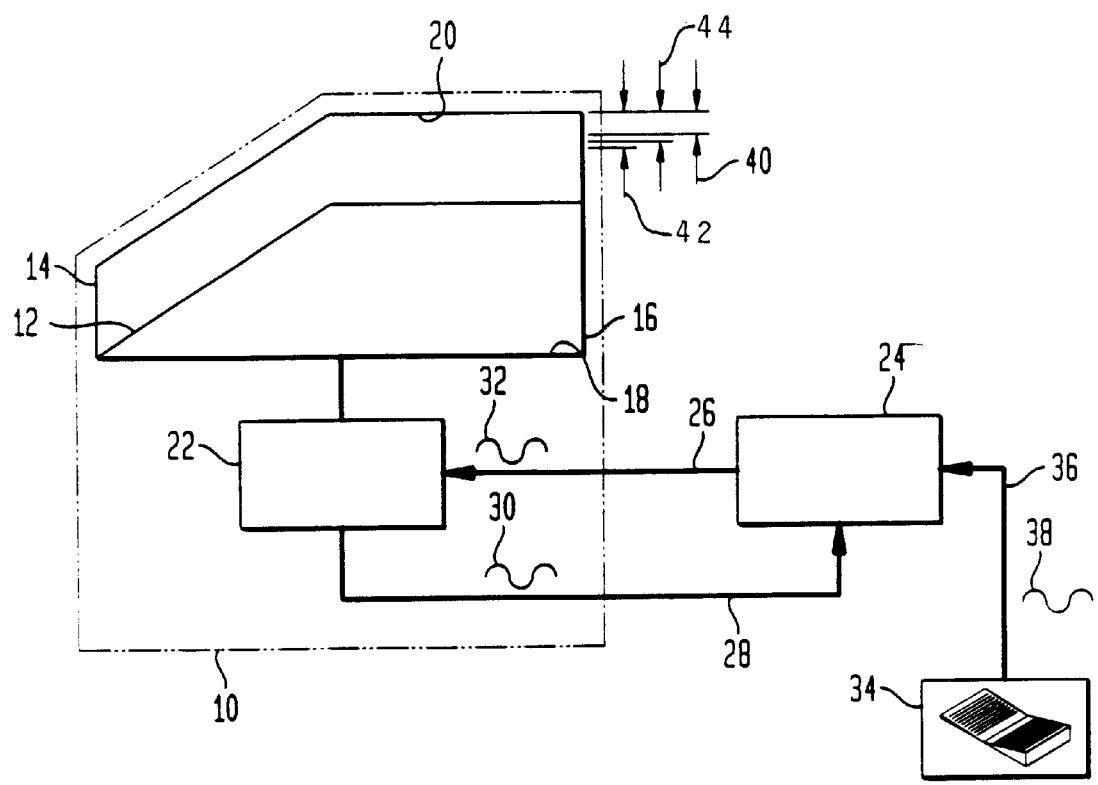
FIG. 1 symbolically depicts a vehicle window, its associated drive and the control for the drive.

As shown in FIG. 1, there is a vehicle door 10 with a window 12. The window is constrained within guide channels 14, 16, 18 of the door frame as it opens and closes. When fully closed, the window 12 seats against the inside channel edge of the top of the doorframe 20. The window is moved between its closed and its various open positions by a window lifter mechanism (not shown). This mechanism can be of any type, such as a drum and cable, an arm and sector, or any other type of window lifter mechanism, all of which are well known to those of ordinary skill in the art. As this invention is suitable for use with any of type of lifter mechanism, no particular one need to be described here in order to adequately understand this invention.

A motor 22 drives the window lifter mechanism. This motor is typically a fractional horsepower 12 or 42-V DC motor, but it need not be. It may be AC or DC of any voltage suitable for the environment in which it operates. The motor may even take the form of a linear piezoelectric device, whose repeated excitation causes a winder to advance, similar to the advanced of gears caused by the regulator on a clock. Likewise, pneumatic and hydraulic drives may be used. A person of ordinary skill in the art may select from these or other power driving devices to drive the lifter mechanism and thereby effect the opening and closing of the window. Since the invention is suitable for use with any form of power driving device, no particular one need be described in any great detail in order to gain a full appreciation of this invention.

The motor 22 is controlled by a motor control 24, which communicates to the motor 22 via electrical wires 26, 28. The motor 22 and control 24, however, need not necessarily be physically connected by wires 26, 28. A person of ordinary skill in the art can easily realize wireless communication between the two via a radiated signal anywhere within the optic and electromagnetic spectrums. The wires 26, 28, however, represent the manner in which controls are typically connected to motors in common usage.

These wires 26, 28 carry one or more signals 30, 32 between the motor 22 and the control 24. From the motor 22, the signal 30 transmitted to the control 24 is generally indicative of one or more attributes of the motor. A person of ordinary skill in the art usually desires the control 24 to receive a signal indicative of motor current, motor torque, or motor speed.

The control 24 also typically has one or more input devices 34 in communication with it, in this example by way of wire 36 but which may also be effected using a wireless signal in the optic or electromagnetic spectrums. The wire 36 transmits a signal 38 from the input device 34 to the control 24. For example, here the input device 34 is a rocker switch whereby a person may indicate his desire to open or close the window. Pressing on one side of the rocker switch transmits an "open" command in signal 38, while pressing on the other side transmits a "close" command. This is commonly known as a two pole rocker switch. The rocker switch may also have two over-travel positions on each side. This type of switch is commonly referred to as a four pole rocker switch. Pressing the switch to the first pole on the "open" side results in the window being commanded to go up only so long as the switch remains depressed in that position. In such an arrangement, releasing the switch from the first "open" pole position causes the window to stop moving. Pressing on the "open" side of the rocker switch past the first pole to the over-travel pole position results in the window being commanded to go up and continue going up regardless of whether the switch is released. This is commonly referred to as an "express up" feature.

Express up and express down features are well known in the art. A switch can effect them as described here, or a person of ordinary skill could use any other switch or combination of switches or input devices. For example, the switch may be a two pole rocker switch. An "express up" command might be effected by pulsing the switch in the "up" position for only an instant, while an ordinary "up" command would result from holding the switch in the "up" position for longer. There could also be separate switches for "up" and "down", or a joystick, or some other input device whereby a user can indicate when to open and close the window, and in what manner. Again, the type of input device 34 is not critical to understanding this invention, and therefor no one particular switch is described in detail.

The wire 36 communicates the signal 38 from the input device 34 to the control 24. The wire 28 communicates the signal 30 from the motor 22 to the control 24. Using these two signals 30, 38, the control 24 performs an analysis to determine what command signal 32, if any, to communicate to the motor via wire 26.

Referring still to FIG. 1, the window 12 has an infinite number of positions between fully closed (that is, seated against the inside channel along the top of the doorframe 20) and fully open. Depending upon the physical size of the glass and of the door 10, and dependent further upon the packaging constraints of the hollow region of the door into which the window 12 is retracted, the fully open position may be at, somewhat above or somewhat below the belt line door channel 18. This is entirely dependent upon the aesthetic styling of the vehicle, and has no substantive effect on the present invention. Indeed, the present invention is suitable for use on all forms of moving panels, not merely vehicle door windows. Thus, this can be readily adapted to a vehicle sunroof or retracting convertible top, a vehicle back light window, a power sliding door, a power liftgate, a power trunk, a power tonneau cover, a power folding seat, a power steering column, power running boards, a power-driven convertible top mechanism, or even to any garage or entry door opening/closing mechanism. The invention is also readily adapted outside of the field of motor vehicles as well, such as to machine tools or robots.

As discussed in the Brief Summary of the Invention, there are many different standards for the manner in which a moving panel is closed. Some standards are promulgated by the government, as in the U.S. rules at 49 CFR §571.118, while there can also be formal or informal industry or even company-by-company standards. For the purposes of this discussion, 49 CFR §571.118 (that is, FMVSS 118) will be used by way of example. If the window 12 is within a minimum proximity of the door frame 20, such that the opening 40 is too small to permit placement of a 4 mm diameter semi-rigid cylindrical rod in the opening 40, then the FMVSS standards do not require the system to discern whether an obstacle is between the window 12 and door frame 20 when the window 12 is closing in "express up" mode. If the window 12 is further away, however, the standards require obstacle detection in most situations.

Proximity 42 depicts a situation where the window 12 is quite close to the door frame 20, but is nonetheless beyond proximity 40. When at this proximity, the standards generally require the control 24 to detect a semi-rigid obstruction placed between the window 12 and door frame 20 as the window closes upon the obstacle. Yet, those of ordinary skill readily appreciate that being in such close proximity to the door frame 20 makes the task of detecting an obstacle much more difficult. That is because most obstacle detection algorithms (whether relying upon motor current or torque, upon motor speed, or upon window speed) require a certain amount of historical data. If the control variable encounters the obstacle too soon within the sampling period, the historical data will be skewed and the data upon encountering the obstacle may look too similar to the earlier data to be discerned as an obstacle.

Prior art systems have compensated for this in many different ways, all of which have their relative advantages and disadvantages in system cost, complexity, robustness and the like. In the present invention, if the window's starting position is between proximities 40 and 42 when an "express up" command is requested, then the express up command is not treated in the normal course. Following are descriptions of the three different preferred manners of effecting exception processing when the window's starting position is quite close to its final closed position when an "express up" command is issued.

In a first embodiment, window 12 is opened to a neutral position 44, and upon reaching this neutral position is then moved toward its closed position in "express up" mode. The neutral position 44 may be predetermined, or may vary depending on factors such as temperature, vehicle speed, key-in or key-out of the ignition, or any other factor deemed relevant by a person of ordinary skill in the art. In this first preferred embodiment, the neutral position 44 is predetermined.

There are several advantages to moving the window 12 to a neutral position 44 before commencing closing. First, there is the advantage of increasing the amount of historical data for the control 24. Having a larger number of historical samples increases the likelihood that differences in the motor attribute signal 30 caused by encountering an obstruction will be more readily recognized by the control 24. Second, if the obstruction is an animate object, opening the window 12 to the neutral position 44 prior to commencing closing increases the amount of time for the object to move out of the way. Third, increasing the distance from proximity 42 to neutral position 44 provides the window 12, motor 22, and the window lifter mechanism more opportunity to build momentum before reaching its final closed position. Increased momentum may be advantageous if a very tight seal is desired between the window 12 and the door frame 20 upon full closure. Likewise, the horsepower rating of the motor 12 and the mass of the window regulator can be reduced in higher speed and hence higher momentum situations, while still yielding the same effective force.

In a second preferred embodiment, if the window's starting position is between proximities 40 and 42 when an "express up" command is requested, the express up command is simply not implemented. The window can still be closed, but the operator must press and hold the conventional "up" button or must somehow otherwise provide a continuous "up" command to the controller. In this embodiment, there is no need to attempt to detect the presence of an obstacle, because the window will cease driving toward close the instant the operator releases the "up" button.

In a third preferred embodiment, if the window's starting position is between proximities 40 and 44 when an "express up" command is requested, the window proceeds directly into "express up" driving mode, but the sensitivity of the obstacle detection scheme is heightened.

Figure 2:
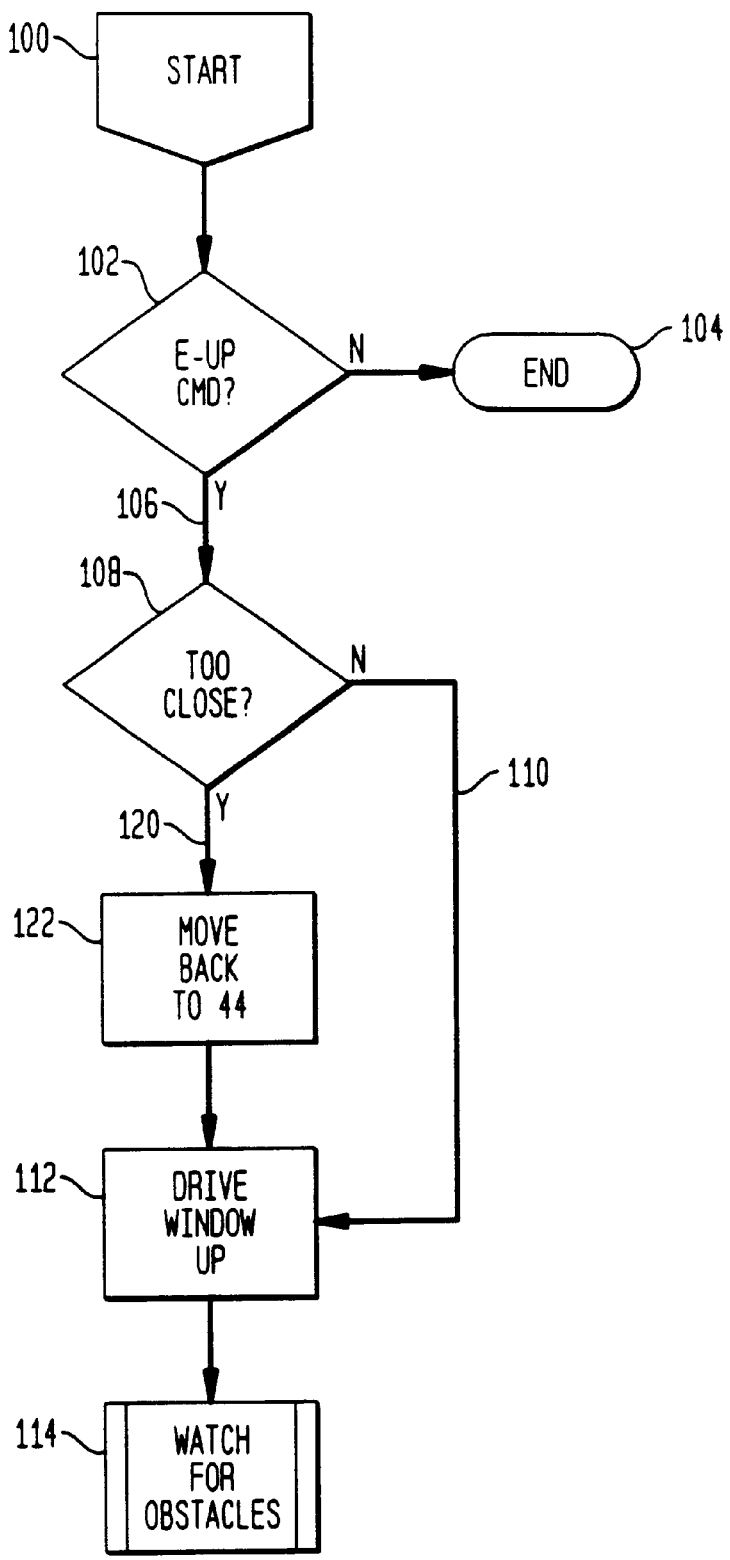
FIG. 2 is a flow chart of a first embodiment of a drive control of a window system of FIG. 1.
Figure 3:
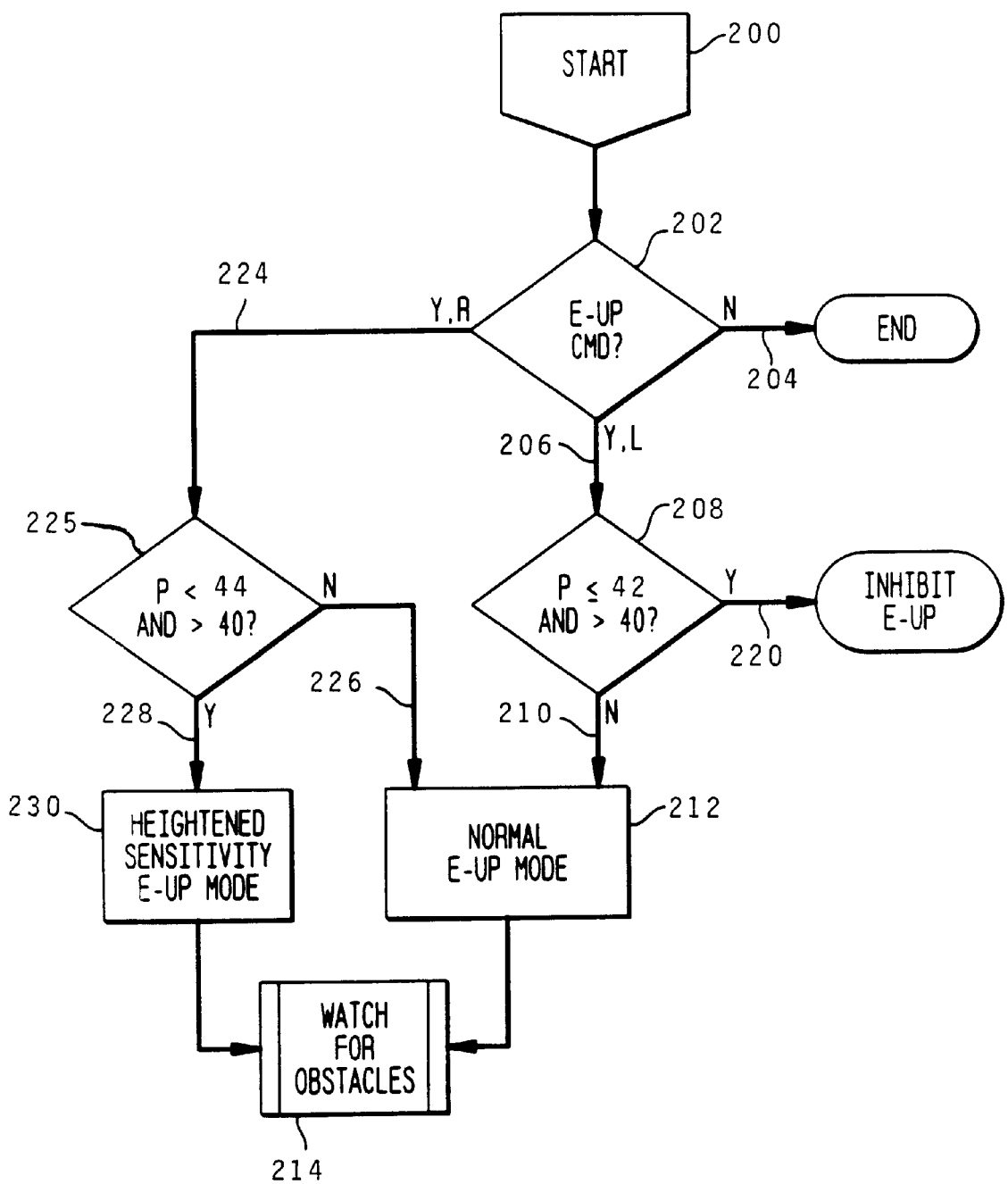
FIG. 3 is a flow chart of a second embodiment of a drive control of a window system of FIG. 1.

Flow charts showing the logical steps of these preferred embodiments are at FIGS. 2 and 3. A person of ordinary skill in the art can appreciate that these flowcharts are for illustrative purposes, and do not represent actual computer programming language commands. Such a person can also readily appreciate that any number of programming languages could be chosen to effect an algorithm to carry out these logical steps. An analog circuit could similarly be readily fashioned by a person of ordinary skill in the art. A person of ordinary skill can further appreciate that the present invention, as illustrated in these preferred embodiments, is suitable for integrated into any window lift motor control system, to supplement whatever algorithm may already be there for discerning window opening and closing commands and for effecting such commands.

Turning to FIG. 2, the entry point of this flowchart 100 leads to the first decision, that being determining whether or not an "express up" command is desired 102. Such a command, as discussed earlier, can be effected using a two pole or four pole rocker switch, using two or more switches, or using some other input device. The control queries the signal from the input device to see if the signal is an "express up" command 102. If there is no command signal, or if the command signal is something other than an "express up" command, the present invention does nothing 104. This does not mean, of course, that the total system into which the present invention belongs does nothing. Rather, this simply means there is no need for the actions of the present invention to be effected.

If an "express up" command has been sent to the control 102, 106, the next step taken is to determine if the starting position of the window is "too close" 108. As described earlier in conjunction with FIG. 1, "too close" can be a fixed value, such as in this embodiment at proximity 42, or it can be variable depending upon the design of the control system. If the window is not between proximities 40 and 42, for the purposes of this embodiment, the window is not "too close" 108, 110. The express up command is permitted to execute as normal, with the window being driven up 112 in its normal continuous fashion and the window control detecting 114 any possible obstacles in its normal fashion. Again, as discussed in conjunction with FIG. 1, driving the window up and down, and detecting possible obstacles are well within the ordinary skill in the art, and no particular means of doing so is necessary for understanding the present invention.

If an "express up" signal is present, and if the window is indeed "too close" when that command is initiated 108, 120, then the window is driven back 122 to neutral position 44 before being driven up 112 in its otherwise normal continuous fashion. The control then sets about determining whether an obstruction is present 114 in its normal fashion.

Determining the position of the window, to thus determine whether it is "too close," can be accomplished a number of different ways. A person of ordinary skill in the art could use one or more limit switches along the travel path of the window. Alternatively, the window channel could be fashioned to include a resistive element, whereby the window travelling in the channel serves as a rheostat, thus changing the effective resistance of the circuit depending upon its position within the channel. Or, a person of ordinary skill could use an optical or radar sensor aimed at the window to determine the position of the window relative to the door frame. As another alternative, the motor itself can have optical or conductive markings on its output shaft, and the rotation of the shaft can be counted to determine indirectly the position of the window. Again, the method used for determining or approximating window position is not critical to fully understanding the present invention.

In fact, it is specifically one purpose of the present invention to effect the controls described here without necessarily requiring additional components. If an existing window drive control uses motor shaft counting to determine window position as part of its existing control scheme, it is envisioned that a person of ordinary skill in the art would want to likewise use the motor shaft counted window position to indicate whether the window is "too close". This does not preclude, of course, permitting additional components to be added if desired. For example, determining position for the purpose of deciding if the window has encountered an obstruction before fully closing may be effected by counting motor shaft rotations, while determining position for the purpose of deciding if the window was too close to the door frame may be effected using an optical sensor aimed at the window.

In the second and third embodiments, shown in FIG. 3, the first step after entering the control algorithm 200 is again to determine if an "express up" command has been issued 202. If there is no "express up" command involved 204, as was the case in the first embodiment, the present invention takes no special action. Whatever command is present (i.e. open window, close window in a mode other than express up), or in fact if no command is present, is acted upon as it normally would without involving the principles of the present invention.

In the embodiments detailed in FIG. 2, the window is not driven back to a neutral position before otherwise proceeding in a normal express up mode as was described in the embodiment of FIG. 1. Rather, two different exception events occur. The first exception event is that, if the window is "too close", express up mode is inhibited and the window may only be closed by an operator continuously issuing a standard "close" command. The second exception event occurs again if the window is "too close", but this time the window proceeds in express up mode with its obstacle detection scheme operating in a heightened sensitivity mode. It should be immediately appreciated that one or the other exception event, of their own, would be sufficient. But here they are illustrated together to show that they can also be combined to provided further benefits. Here, "too close" for the purposes of inhibiting express up may be one proximity which is in fact different than the other proximity defining "too close" for the purposes of heightening obstacle detection sensitivity.

To further explain these exception events, "too close" for the purpose of inhibiting express up is illustrated at step 208. For the purposes of the exception event of the second embodiment, "too close" is defined as a window position closer than proximity 42, yet still beyond proximity 40 and thus within the region where government regulations require obstacle detection if the window is to be closed in "express up" mode. If an express up command is present (202, 206) and the window is between proximities 40 and 42 (step 208=true, at 220), then express up mode is inhibited. The window may still be closed, but the operator must do so using a conventional "up" command, where the "up" button must remain depressed for the window to continue travelling up. Releasing the up button would result in the window ceasing to move. If, on the other hand, the window is not between proximities 40 and 42 (step 208=false, at 210), then express up proceeds as it normally would 212. This would include the normal obstacle detection scheme 214. Again, as explained in conjunction with FIG. 1, the manner in which express up and obstacle detection are implemented in any given situation are well within the design choices that one of ordinary in the art can readily discern. No one particular manner of implementing these functions need be described here in order to gain a full appreciation of the invention.

The third embodiment, also shown in FIG. 2, involves determining whether an express up command has been issued (204, 224), and if so again determining the position of the window relative to its final closed position when that command was issued. Here, if the window is between proximities 40 and 44 (step 225=true, 228), then is window is "too close" for normal express up mode. Instead, a heightened sensitivity mode of express up is executed 230. During this mode, special attention is paid to the motor attributes normally tracked to determine whether or not an obstacle has been encountered 214.

For example, if motor speed is the attribute used to determine if an obstacle has been encountered, during heightened sensitivity mode the degree of change in motor speed necessary to indicate an obstacle may be lowered. Thus, if a 50% decrease in motor speed indicates having encountered an obstacle during normal obstacle detection sensitivity, heightening the sensitivity would involve using a lower threshold such as a 20% decrease in motor speed. Conversely, if motor current is the attribute being observed, a lower rate of increase in motor current may signal having encountered an obstacle in heightened sensitivity mode than the rate of increase required during normal obstacle detection sensitivity mode. The motor attribute being observed to determine the presence or likely presence of an obstacle is not of critical importance to understanding the invention.

Moreover, if obstacle detection is normally effected in some other manner, such as by using an optical or capacative sensor aimed at the region where the window meets the window frame, then heightening the sensitivity may involve filtering out fewer proximal signals which otherwise would be attributed to noise or scatter interference. The goal of heightening sensitivity in this "too close" region is to increase the likelihood that a small obstacle can be readily detected despite the fact that the window is in close proximity to its final closed position, and despite the fact that this close proximity may make obstacle detection more difficult.

Finishing the discussion of the third embodiment, if the window is not too close when the express up command is issued 226, then it proceeds in its normal express up mode 212 and proceeds to watch for obstacles 214 using its normal level of sensitivity.

As mentioned earlier, the second and third embodiments may be combined as shown in FIG. 3, where "too close" for the purposes of inhibiting express up occurs between proximities 40 and 42 (208, 220), and where "too close" for the purposes of needing to heighten obstacle detection sensitivity (225, 228) occurs between proximities 40 and 44. Just as easily, the two embodiments could be separated and only one or the other implemented. Likewise, the exception processing of the first embodiment may be combined with the exception processing of the third embodiment, or they may stand alone. Such design choices are well within the skills of a person of ordinary skill in the art.

Accordingly, it should be appreciated through an understanding of the descriptions of these three embodiments that it is desirable to undertake exception processing of an "express up" command when the starting position of the window is in close proximity to its final closed position.

Throughout the discussion of these preferred embodiments, reference has been made to an "express up" feature for a vehicle power window control system. However, one of ordinary skill in the art can appreciate that the present invention is readily applicable to any situation in which a moveable element is desired to be moved in a continuous fashion analogous to a vehicle window "express up" command.

For example, the closing of a garage door is immediately suited to the principles of this invention. When the garage door "close" button is pressed momentarily, the door in most conventional garage door systems continues to be driven closed until it reaches its fully closed position. That same garage door must be reopened if an obstacle is detected in its path while closing. Just as in a vehicle window system, it may be more difficult to detect the presence of an obstacle if the garage door is quite close to being fully closed when the "close" button is pressed. Likewise, a vehicle tonneau cover, trunk lid or liftgate may be driven closed in a continuous or "express" mode, with similar need for detecting obstacles and reversing upon their detection. Applications are also readily apparent to machine tools and robots, where extra care must be taken during the last stages of moving the tool in order to avoid damaging the work piece. Thus, one of ordinary skill in the art need not engage in undue experimentation to readily adapt the principles of this invention to any situation involving moving elements where there is a need to either cease or reverse the movement of that moving element upon detection of an obstacle in the path of movement, and further to those situations where the detection scheme would otherwise be less effective through any portion of that path of movement.

Thus, it should be readily apparent to a person of ordinary skill in the art that it has been provided, in accordance with the present invention, a system and method that fully satisfies the objectives, features and advantages set forth above. It should further be readily apparent that, while a preferred embodiment has been illustrated here, there are many other alternative, modified or varied means of effecting the present invention that fall within the spirit and scope of what is now claimed here.

We claim:

1. A method for driving a movable panel from an open position to a closed position in a continuous manner in response to an first close command communicated from an input device to a controller adapted to control the manner in which said panel is driven to said close position by a drive mechanism and for automatically reopening said panel if an obstruction of no less than a first dimension and no more than a second dimension in diameter is encountered by said panel as it is driven toward said closed position, the method comprising the steps of:

determining if said panel is more than a first predetermined proximity from said closed position when said first close command is communicated to said controller, and driving said panel to said closed position in said continuous manner only if said panel is more than said first predetermined proximity from said closed position, where said first predetermined proximity is at least as great as said second dimension.

2. A method of claim 1, wherein if said panel is within said first predetermined proximity when said first command is communicated to said controller, determining if a second signal is communicated from said input device to said controller, and driving said panel to said closed position only if said second signal is communicated from said input device to said controller.

3. A method of claim 2, wherein said panel is driven to said closed position only while said second signal is communicated from said input device to said controller.

4. A method of claim 1, wherein if said panel is within said first predetermined proximity when said first command is communicated to said controller, first driving said panel to a second proximity from said closed position wherein said second proximity is at least as great as said first predetermined proximity, and then driving said panel to said closed position in said continuous manner from said second proximity.

5. A vehicle window lifter control system, said system comprising a drive mechanism for actuating said window lifter and for thereby causing said window to be selectively moved between open and closed positions, a controller for controlling said drive mechanism, and at least one input device for selectively indicating the desire of an operator to have said window driven open or close by said drive mechanism, said controller adapted to determine if said input device indicates said operator's desire to close said window and, if said input device does indicate a desire to close said window, said system determining the position of said window relative to said closed position, said controller controlling said drive mechanism to drive said window toward said closed position only if said window is at least a predetermined proximity away from said closed position.

6. A vehicle window lifter control system, said system comprising a drive mechanism for actuating said window lifter and for thereby causing said window to be selectively moved between open and closed positions, a controller for controlling said drive mechanism, and at least one input device for selectively indicating the desire of an operator to have said window driven open or close by said drive mechanism, said controller adapted to determine if said input device indicates said operator's desire to close said window and, if said input device does indicate a desire to close said window, said system determining the position of said window relative to said closed position, said controller controlling said drive mechanism to drive said window toward said closed position if said window is at least a predetermined proximity away from said closed position, and if said window is less than a predetermined proximity away from said closed position said system controlling said drive mechanism to drive said window first toward a neutral position which is of a proximity greater than said predetermined proximity and to then drive said window toward said closed position from said neutral position.

7. A vehicle window lifter control system, said system comprising a drive mechanism for actuating said window lifter and for thereby causing said window to be selectively moved between open and closed positions, a controller for controlling said drive mechanism, and at least one input device for selectively indicating the desire of an operator to have said window driven open or close by said drive mechanism, said input device capable of indicating the desire of said operator to close said window in a manner requiring no intervention by said operator and said input device further capable of indicating the desire of said operator to close said window in a manner requiring continued intervention by said operator, said controller adapted to determine if said input device indicates said operators desire to close said window in said no intervention manner and, if said input device does indicate a desire to close said window in said no intervention manner, said system determining the position of said window relative to said closed position, said controller controlling said drive mechanism to drive said window toward said closed position if said window is at least a predetermined proximity away from said closed position and said controller otherwise controlling said drive mechanism to drive said window toward said closed position only if said input device indicates said operator is providing intervention.

8. A system for driving a movable panel from an open position to a closed position in a continuous manner comprising:
   a panel;
   a drive mechanism for moving said panel between open and closed positions;
   an input device for communicating a first command to move said panel; and
   a controller adapted to control the manner in which said panel is driven to said closed position by said drive mechanism and for automatically reopening said panel if an obstruction of no less than a first dimension in size and no more than a second dimension in size is encountered by said panel as it is driven toward said closed position and driving said panel to said closed position in a continuous manner only if said panel is more than a first predetermined proximity from said closed position when said first command is communicated to said controller wherein said first predetermined proximity is at least as great as said second dimension.

9. A system of claim 8, wherein if said panel is within said first predetermined proximity when said first command is communicated to said controller, said panel is driven to said closed position only if a second signal is communicated from said input device to said controller.

10. A system of claim 9, wherein said panel is driven to said closed position only while said second signal is communicated from said input device to said controller.

11. A system of claim 8, wherein if said panel is within said first predetermined proximity when said first command is communicated to said controller, said panel is first driven to a second proximity from said closed position wherein said second proximity is at least as great as said first predetermined proximity, and then driving said panel to said closed position in said continuous manner from said second proximity.

12. A method for driving a movable panel from an open position to a closed position in a continuous manner comprising the steps of:
   receiving a close command from an input device;
   determining a proximity distance between the panel and the closed position;
   comparing the proximity distance to a first predetermined proximity from the closed position defined by predetermined dimension of an obstacle;
   prohibiting continuous operation to the closed position if the proximity distance is less than the first predetermined proximity;
   comparing the proximity distance to a second predetermined proximity from the closed position that is greater than the first predetermined proximity if the proximity distance is at least the size of the predetermined dimension during issuance of the close command; and
   determining whether continuous operation to the closed position is permissible based on the comparison between the proximity distance and the second predetermined proximity.

13. A method of claim 12 including the step of moving the panel to a neutral proximity position relative to the closed position that is greater than the first predetermined proximity if the proximity distance is between the first and second predetermined proximities and then permitting continuous operation to the closed position once the panel has moved to the neutral proximity position.

14. A method of claim 12 including the step of prohibiting continuous operation to the closed position if the proximity distance is greater than the first predetermined proximity and less than the second predetermined proximity.

15. A method of claim 12 including the step of permitting continuous operation to the closed position if the proximity distance is greater than the first predetermined proximity and less than the second predetermined proximity while simultaneously increasing sensitivity standards for obstacle detection.

16. A method of claim 12 including the step of automatically reopening the panel if an obstacle having a size at least that of the predetermined dimension is detected.

* * * * *